United States Patent
Chang et al.

(10) Patent No.: US 9,028,072 B2
(45) Date of Patent: May 12, 2015

(54) LASER PROJECTION SYSTEM WITH SECURITY PROTECTION MECHANISM

(71) Applicant: Lite-On IT Corporation, Taipei (TW)

(72) Inventors: Wei-Tien Chang, Hsinchu (TW); Fu-Ji Tsai, Hsinchu (TW); Chih-Chien Lu, Hsinchu (TW); Wei-Chih Lin, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 297 days.

(21) Appl. No.: 13/845,075

(22) Filed: Mar. 17, 2013

(65) Prior Publication Data

US 2014/0036235 A1    Feb. 6, 2014

(30) Foreign Application Priority Data

Aug. 2, 2012    (CN) .......................... 2012 1 0272658

(51) Int. Cl.
| | |
|---|---|
| *G03B 21/26* | (2006.01) |
| *G03B 21/00* | (2006.01) |
| *G06K 9/00* | (2006.01) |
| *G03B 21/20* | (2006.01) |
| *G06F 3/01* | (2006.01) |
| *G06F 3/042* | (2006.01) |
| *H04N 9/31* | (2006.01) |

(52) U.S. Cl.
CPC ............ *G03B 21/2053* (2013.01); *G03B 21/26* (2013.01); *G06K 9/00228* (2013.01); *G06K 9/00362* (2013.01); *G06K 9/00369* (2013.01); *G06F 3/017* (2013.01); *G06F 3/0425* (2013.01); *G03B 21/2033* (2013.01); *G03B 21/2086* (2013.01); *H04N 9/3161* (2013.01); *H04N 9/3194* (2013.01)

(58) Field of Classification Search
CPC ........ G03B 21/26; G03B 21/14; G03B 21/00; G03B 21/2033; G06K 9/00228; G06K 9/00362; G06K 9/00369; H04N 9/3161; G06F 3/017; G06F 3/0425
USPC .............................. 353/31; 382/103; 348/744
See application file for complete search history.

(56) References Cited

U.S. PATENT DOCUMENTS

| | | | |
|---|---|---|---|
| 6,361,173 B1 | 3/2002 | Vlahos et al. | |
| 6,661,820 B1 | 12/2003 | Camilleri et al. | |
| 6,984,039 B2 | 1/2006 | Agostinelli | |
| 7,165,844 B2 * | 1/2007 | Kobori et al. | 353/30 |
| 2010/0177929 A1 | 7/2010 | Kurtz et al. | |

FOREIGN PATENT DOCUMENTS

WO    WO-2011/012168 A1    2/2011

* cited by examiner

*Primary Examiner* — Toan Ton
*Assistant Examiner* — Magda Cruz
(74) *Attorney, Agent, or Firm* — Rabin & Berdo, P.C.

(57) ABSTRACT

A laser projection system comprising a laser light and a human body detection module is disclosed. The laser light source emits a laser light. The human body detection module detects a reflective light of the laser light irradiated on an object. The human body detection module determines whether the object is a human according to a relationship between several reflectivity indexes of the reflective light. If the relationship corresponds to predefined situation, the human body detection module reduces a laser output intensity of the laser light.

9 Claims, 3 Drawing Sheets

LASER PROJECTION SYSTEM WITH SECURITY PROTECTION MECHANISM

This application claims the benefit of People's Republic of China application Serial No. 201210272658.9, filed Aug. 2, 2012, the subject matter of which is incorporated herein by reference.

TECHNICAL FIELD

The disclosure relates in general to a laser projection system, and more particularly to a laser projection system with security protection mechanism.

BACKGROUND

Consumers are very concerned about safety of electronic products using laser light because a few milliwatts (mW) of laser irradiation would suffice to cause harm to the eyes. Therefore, the use of laser light must satisfy safety classification as:

Class I/1: the laser light in the device, such as a CD player, is safe. This is because the laser light is contained and enclosed in the device.

Class II/2: the laser light used under normal circumstances is safe, and the blink reflex of human eyes can avoid human eyes being harmed. The laser power of such device, such as a laser pointer, is normally lower than 1 mW.

Class IIIa/3R: the laser power normally would reach 5 mW, and there is a little risk that the laser light may cause harm to the eyes even in a split of the time as short as the blink reflex of the eyes. Watching such light beam for a few seconds may cause harm to the retina.

Class IIIb/3B: the eyes will be harmed immediately when exposed to the laser light.

Class IV/4: the laser light will singe the skin, and under some circumstances, even scattered laser light may cause harm to the eyes and the skin.

The laser projection system, having small size, high contrast, wide gamut and focus free, has been widely used and has gained greater and greater popularity. However, if the laser light is used in a projection device, the above safety classification must be satisfied.

To avoid the laser light causing harm to the eyes, an image sensor is disposed on the laser projection system. The image sensor detects the projection range, and sends the detection results back to the laser projection system to determine whether someone appears within the projection range and the position of this person. Normally, such laser projection system requires complicated algorithms and high circuit costs.

Another way of laser safety protection can be achieved by disposing a photo-intensity sensor on the laser projection system to detect the intensity of reflective light within the projection range. If it is detected that an object is moving within the projection range, either the power of the laser light source is reduced or the laser light source is turned off.

The photo-intensity sensor is classified into an active far-infrared light intensity sensor and a passive far-infrared light intensity sensor. The passive far-infrared light intensity sensor detects whether there are charges generated according to temperature changes. However, if someone is already within the projection range before the laser projection device is booted, then the passive far-infrared light intensity sensor would not be able to detect this person.

The active far-infrared light intensity sensor emits an infrared light beam to detect the movement of an object. The active far-infrared light intensity sensor determines whether there are any objects moving according to whether the reflective light intensity varies with the time. Therefore, the active far-infrared light intensity sensor cannot detect the static object.

SUMMARY OF THE DISCLOSURE

The disclosure is directed to a laser projection system with security protection mechanism. The laser projection system has a distance detection module which dynamically adjusts a laser output intensity according to the distance between a projection surface (such as a screen) and the laser projection system.

The disclosure is directed to a laser projection system with security protection mechanism. The laser projection system has a laser light source for emitting a laser light. The laser projection system has a human body detection module. When it is detected that someone appears in a region on a projection optical path, the intensity of the laser light irradiated on the region is reduced, and the intensity of the laser light irradiated on the other region is not adjusted.

The disclosure is directed to a laser projection system with security protection mechanism. The laser projection system determines whether someone appears in a region on a projection optical path according to the relationship between several reflectivity indexes of the reflective light.

According to an exemplary embodiment of the present disclosure, a laser projection system comprising a laser light and a human body detection module is disclosed. The laser light source emits a laser light. The human body detection module detects a reflective light of the laser light irradiated on an object. The human body detection module determines whether the object is a human according to the relationship between several reflectivity indexes of the reflective light. If the relationship corresponds to predefined situation, the human body detection module reduces a laser output intensity of the laser light.

The above and other contents of the disclosure will become better understood with regard to the following detailed description of the preferred but non-limiting embodiment(s). The following description is made with reference to the accompanying drawings.

DETAILED DESCRIPTION OF THE DISCLOSURE

In the present embodiment of the disclosure, the laser projection system dynamically adjusts laser output intensity according to the distance between a projection surface and the laser projection system for adjusting different laser light intensities irradiated on the projection surface in different distances.

In the present embodiment of the disclosure, when the laser projection system with security protection mechanism detects that someone appears in a region on a projection optical path, the intensity of the laser light irradiated on the region is reduced while the intensity of the laser light irradiated on the other region is not adjusted.

In the present embodiment of the disclosure, the laser projection system with security protection mechanism determines whether someone appears in a region on a projection optical path according to the relationship between the reflective intensity of the visible light and the reflective intensity of the near-infrared light and reduces the intensity of the laser light irradiated on the region.

Figure 1:
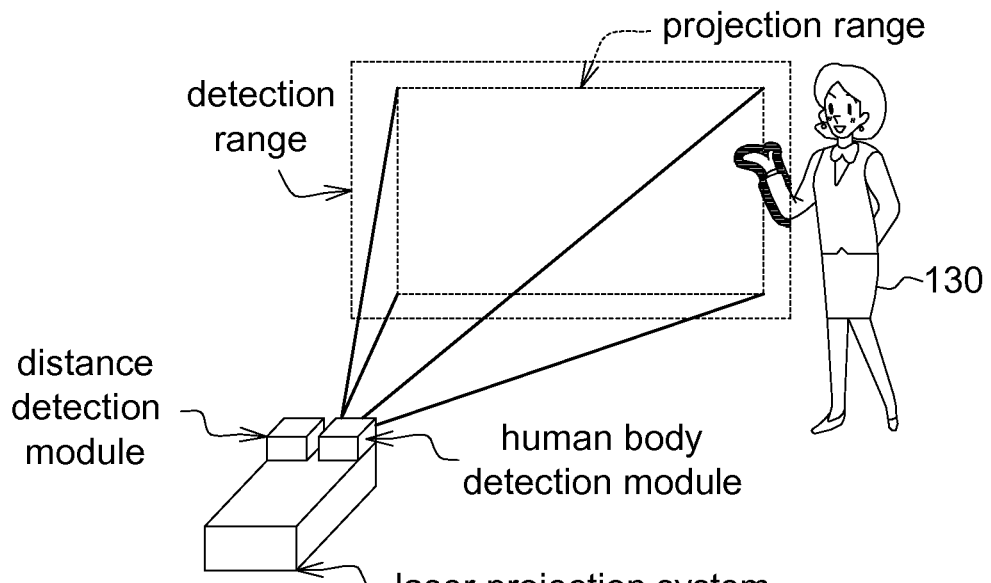
FIG. 1 shows a schematic diagram of a laser projection system with security protection mechanism according to an embodiment of the disclosure.

Referring to FIG. 1, a schematic diagram of a laser projection system 100 with security protection mechanism according to an embodiment of the disclosure is shown. As indicated in FIG. 1, the laser projection system 100 comprises a distance detection module 110 and a human body detection module 120. The distance detection module 110 detects a distance between a projection surface and the laser projection system 100. The human body detection module 120 detects whether someone appears on the projection optical path.

To further improve the detection, in the present embodiment of the disclosure, a projection range R1 of the laser projection system 100 is smaller than a detection range R2 of the distance detection module 110 and the human body detection module 120. This is because a human 130 may appear on the margins of the projection range R1 (as indicated in FIG. 1).

In the present embodiment of the disclosure, the distance detection module 110 detects the distances between the regions on the projection surface and the laser projection system 100. A distance map is established from the distance information. The distance map such as records of respective distances between the regions on the projection surface and the laser projection system 100. According to the distance map, the projection surface is partitioned into regions and/or the laser output intensity is dynamically adjusted.

In the present embodiment of the disclosure, the operation principles of the distance detection module 110 are exemplified below but are not limited to the exemplification. An input signal $f_O$ and an input signal $f_I$ are mixed and then are inputted to a laser light by a driving unit. The frequency of the input signal $f_O$ is slightly different from that of the input signal $f_I$ (frequency difference may be 0.1~100K, depending on the situations and application). The laser light emitted by the laser light source is irradiated on the test object and then is reflected to the distance detection module 110. The intensity of the reflective laser light is detected by a photo-detector of the distance detection module 110. The reflective light intensity signal is amplified, processed and further filtered by a low-pass filter. A mixing signal, which is mixed from the reflected input signals $f_O$ and $f_I$, is filtered by another low-pass filter. The two filtered signals are compared to obtain a phase difference. Based on the phase difference, the distance between the object and the distance detection module 110 can be obtained.

If the intensity of the laser light irradiated by the laser projection system 100 is too strong, the laser light may cause harm to humans. Conversely, if the intensity of the laser light is not strong enough, the intensity of projection surface may be insufficient. Therefore, the human body detection module 120 may detect whether someone appears within the projection range R1 of the laser projection system 100 at all times. If it is detected that someone appears in a region on a projection optical path, the intensity of the laser light irradiated on the region is reduced while the intensity of the laser light irradiated on the other region is not adjusted.

The laser projection system 100 further comprises a lens module. The lens module may swing in a two-dimensional direction. The lens module comprises a lens or a lens group. The laser beam emitted from a light source is reflected by the lens module, and the scan order of the reflective light can be realized by raster scanning (that is, left to right first and then top to down) or Lissajous scanning. The laser beam can be realized by a co-axial laser light containing a red, a blue, a green and an infrared light beam. The laser light reflected by the lens module is further irradiated on a projection surface, and becomes viewable to the eyes according to the principle of persistence of vision.

In the present embodiment of the disclosure, the distance detection module 110 may use an existing laser light source of the laser projection system 100 as its laser light source or may use another independent laser light source (emitting a visible light or an invisible light). Without affecting the viewer's viewing, the independent laser light source detects the distance for each region, and recognizes the distance of a region according to the time difference between emitting the laser light and receiving the reflected laser light The swing angle of the lens module determines the projection position of the laser light spot on the projection surface. Therefore, the X-Y coordinate position of the laser light on the projection surface can be obtained by detecting the swing angle of the lens module in the two-dimensional direction. When a laser light scans a human body, the laser light will be reflected by the human body. A position of the target object can be obtained after the photo-detector (formed by such as a photodiode) receives the reflective laser light and compares the spectrum reflectivity of the reflective laser light. The photo-detector is disposed on the same side with the output of the laser light. The variation in the swing angle of the lens module can be detected by a capacitive or an optical detection system.

As the scan type reflective lens module is used, time vs. reflective light intensity distribution for each point in the space can be obtained through an infrared (IR) light source and the photo-detector, and the position of an object can be obtained accordingly no matter the object is still or moving. On the contrary, the conventional infrared detection system can only detect moving objects and cannot detect still objects.

In addition to the red/green/blue light sources, the present embodiment of the disclosure further have an infrared light source and a photo-detector for detecting the position of an object without increasing too much cost and space for the light source.

In terms of the current technology, despite the position of a still object can be detected by using an image detector, however, the cost is dearly. In the present embodiment of the disclosure, the reflective lens module and the photo-detector can detect the position of an object no matter the object is still or moving. Therefore, in the present embodiment of the disclosure, the laser projection system 100 can detect the position of an object within the projection range no matter the object is still or moving, and accordingly adjust the laser power.

Figure 2:
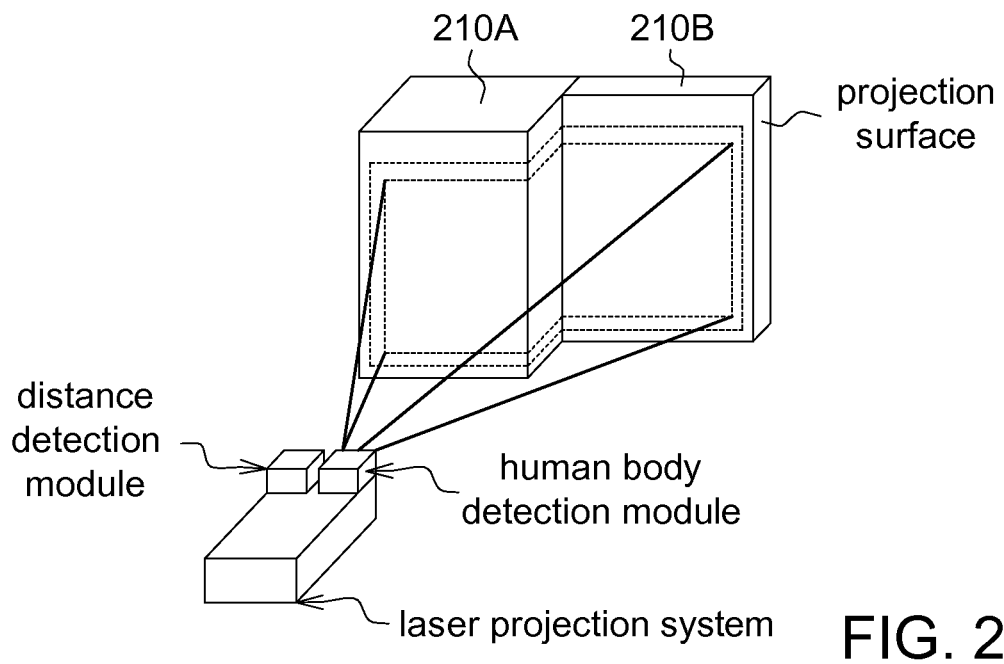
FIG. 2 shows a schematic diagram of adjusting the intensity of the laser light region by region according to an embodiment of the disclosure.

Referring to FIG. 2, a schematic diagram of adjusting laser light intensity region by region according to an embodiment of the disclosure is shown. Suppose the projection surface 210 is uneven and can be divided into two sub-projection surfaces 210A and 210B. In FIG. 2, the sub-projection surface 210A is closer to the laser projection system 100 than the sub-projection surface 210B is. When the laser projection system 100 is booted, the distance detection module 110 will emit a light (either a visible light or an invisible light) to detect the distance between the projection surface 210 and the laser projection system 100.

As indicated in FIG. 2, if the laser projection system 100 detects that the sub-projection surface 210A is closer to the laser projection system 100 than the sub-projection surface 210B is, then the laser projection system 100 will adjust the intensity of the laser light region by region. For example, the intensity of the laser light irradiated on the sub-projection surface 210A is adjusted to be lower than the intensity of the laser light irradiated on the sub-projection surface 210B. By doing so, the user will feel that the projection intensity is uniform, and will not feel non-uniform projection intensity caused by distance difference of the two sub-projection surfaces 210A and 210B.

Figure 3:
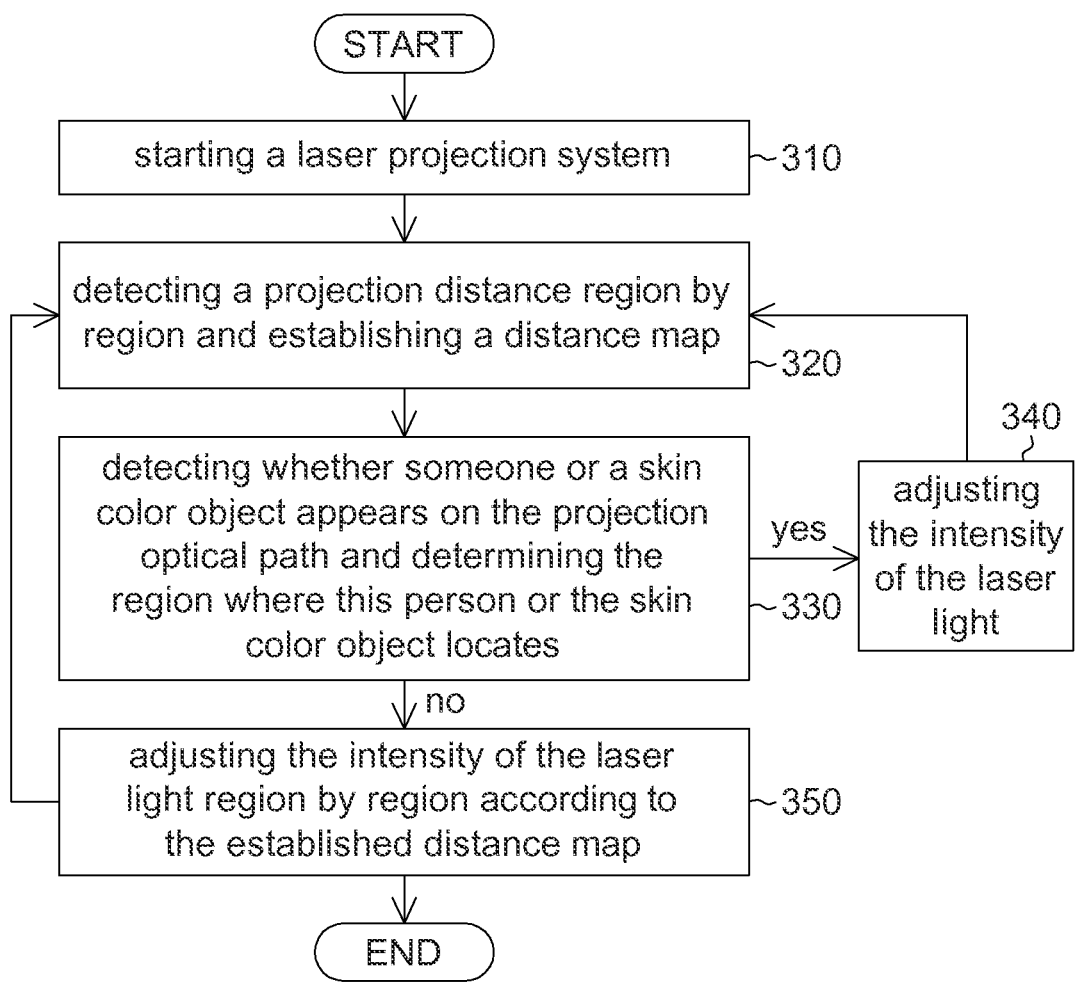
FIG. 3 shows an execution flowchart of the laser projection system according to an embodiment of the disclosure.

Referring to FIG. 3, an execution flowchart of the laser projection system 100 according to an embodiment of the disclosure is shown. As indicated in FIG. 3, in step 310, the laser projection system 100 is started. In step 320, a projection distance is detected region by region and a distance map is established accordingly. Details of step 320 are disclosed above, and are not repeated herein. In step 330, whether someone or a skin color object appears on the projection optical path is detected, and the region of this person or the skin color object is determined. Details of how to detect whether someone or a skin color object appears on the projection optical path will be disclosed below.

If someone or a skin color object is detected on the projection optical path in step 330, then the process proceeds to step 340. In step 340, the intensity of the laser light is adjusted. There are different methods for reducing the intensity of the laser light. For example, the intensity of the laser light can be reduced by increasing the output period of the laser light (that is, by reducing the number of emitting the light beam per unit time) or by reducing the projection density of the laser light (that is, by reducing the number of dots of a light beam per unit area). In step 340, the intensity of the laser light may even be adjusted to be lower than a maximum permissible exposure (MPE). After the intensity of the laser light is reduced, the process returns to step 320.

If no one or not any skin color object is detected on the projection optical path in step 330, then the process proceeds to step 350. In step 350, the intensity of the laser light is adjusted region by region according to the established distance map. In the present embodiment of the disclosure, after step 350 is executed, the process may return to step 320 and again detect the projection distance region by region because the projection distance may have changed.

After the intensity of the laser light is reduced, if no one or not any skin color object is detected on the projection optical path in step 330 (for example, people may have left the projection optical path), the intensity of the laser light may even be adjusted to the maximum permissible exposure or even higher.

Figure 4:
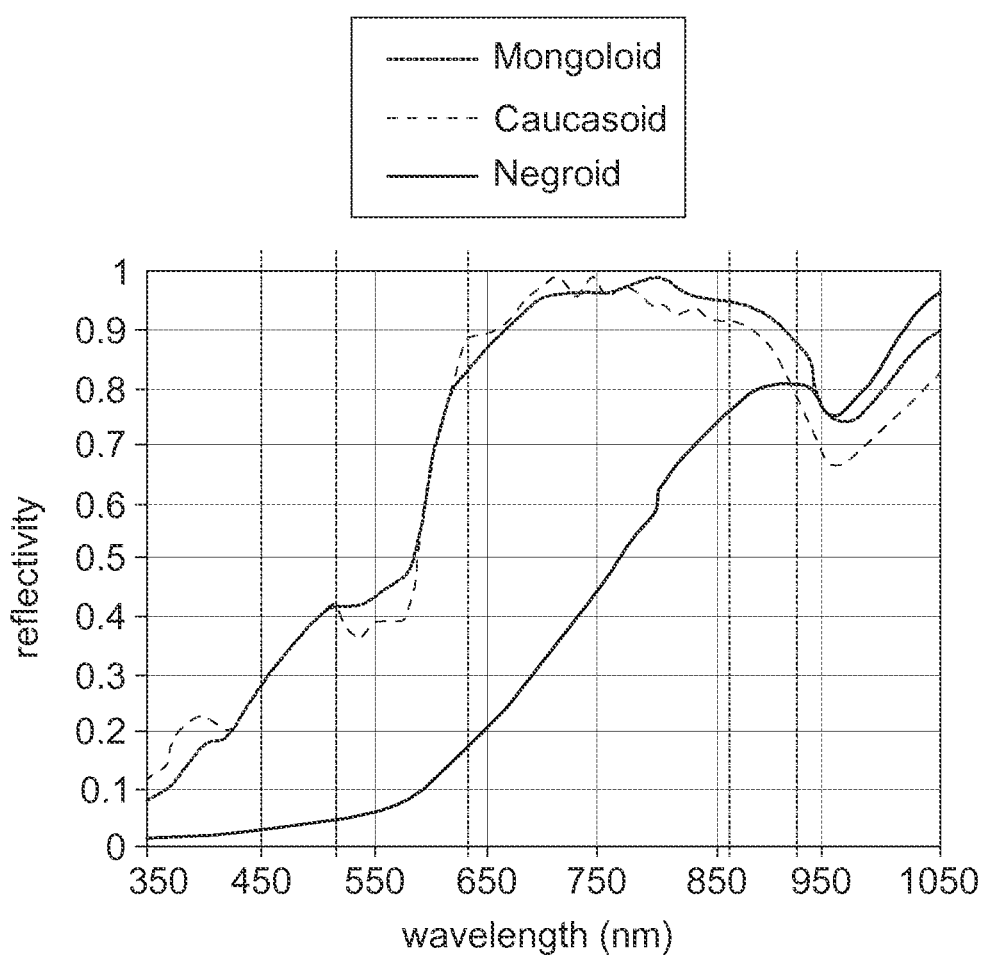
FIG. 4 shows a comparison of skin reflectivity for different races (Caucasoid, Mongoloid, and Negroid).

Details of detecting people and/or skin color objects in the present embodiment of the disclosure are disclosed below. Referring to FIG. 4, a comparison of skin reflectivity for different races (Caucasoid, Mongoloid, and Negroid) is shown. In the present embodiment of the disclosure, the human body is detected by the spectrum comparison method. Whether the reflection is caused by human skin may be determined according to a comparison of reflectivity of different wavelength lights reflected from skins of people of different races. Two scenarios are disclosed below:

(A) The human detection module uses an additional invisible light source:

The wavelengths of the red light, the blue light and the green light are respectively 638 nm, 445 nm and 515 nm. The wavelength of the near-infrared light is 930 nm. Therefore, if the human detection module uses an additional invisible light source, the human detection module, when detecting whether someone appears on the projection optical path, will emit a near-infrared light, a red light, a blue light and a green light. FIG. 4 shows that larger reflectivity difference occurs between the near-infrared light, the blue light and the green light. During detection, whether the reflection is caused by human skins may be determined according to a comparison between the reflectivity of the near-infrared light and the reflectivity of the blue light and a comparison between the reflectivity of the near-infrared light and the reflectivity of the green light. To put it in greater details, the determination may be made according to the following formulas:

$$Lum(930\ nm) - 2*Lum(445\ nm) > 0 \qquad (1)$$

$$Lum(930\ nm) - Lum(515\ nm) > 0 \qquad (2)$$

If both formulas (1) and (2) hold true, then it is determined that the reflection is caused by human skins. That is, in the present embodiment of the disclosure, it is determined that someone appears within the projection range.

(B) The human detection module does not use any invisible light sources:

Suppose the human detection module does not use an additional invisible light source. The human detection module, when detecting whether someone appears on the projection optical path, will emit a red light, a blue light and a green light. FIG. 4 shows that larger reflectivity difference occurs between the red light, the blue light and the green light. During detection, whether the reflection is caused by human skins may be determined according to a comparison between the reflectivity of the red light and the reflectivity of the blue light and a comparison between the reflectivity of the red light and the reflectivity of the green light. To put it in greater details, the determination can be made according to the following formulas:

$$Lum(638\ nm) - Lum(445\ nm) > 0 \qquad (3)$$

$$Lum(638\ nm) - Lum(515\ nm) > 0 \qquad (4)$$

If both formulas (3) and (4) hold true, then it is determined that the reflection is caused by human skin. That is, in the present embodiment of the disclosure, it is determined that someone appears within the projection range.

According to above disclosure, whether someone appears within the projection range may be determined according to the relationship between the reflectivity of the visible light and the reflectivity of the invisible light.

Since the difference between the reflectivity of the near-infrared light and the reflectivity of the red light is insignificant, the above determination is not based on the difference between the reflectivity of the near-infrared light and the reflectivity of the red light. However, anyone who is skilled in the technology of the disclosure will understand that in other embodiments of the disclosure, whether someone appears within the projection range still can be determined according to the difference between the reflectivity of the near-infrared light and the reflectivity of the red light, and such determination method is still within the spirit of the disclosure.

According to the above disclosure of the present embodiment of the disclosure, detection of the human body can be dynamically performed without affecting the user viewing, such that the intensity of the laser light can be dynamically adjusted and the laser light will not cause harm to the human body.

According to the above disclosure of the present embodiment of the disclosure, detection of the projection distance can be dynamic, such that the intensity of the laser light can be dynamically adjusted region by region to avoid the difference in projection distance resulting in non-uniform projection intensity.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A laser projection system, comprising:
    a laser light source emitting a laser light; and
    a human body detection module detecting a reflective light of the laser light irradiated on an object, wherein the human body detection module determines whether the object is a human according to a relationship between a plurality of reflectivity indexes of the reflective light, if the relationship corresponds to a predefined situation, the human body detection module reduces a laser output intensity of the laser light.

2. The laser projection system according to claim 1, wherein,
    the laser light source emits a visible laser light and an invisible laser light; and
    the human body detection module determines whether the object is a human according to a relationship between a reflectivity of the visible laser light and a reflectivity of the invisible laser light.

3. The laser projection system according to claim 2, wherein,
    the visible laser light comprises a red light, a blue light and a green light, and the invisible laser light comprises a near-infrared light; and
    the human body detection module determines whether the object is a human according to a relationship between a reflectivity of the blue light and a reflectivity of the near-infrared light, and a relationship between a reflectivity of the green light and a reflectivity of the near-infrared light.

4. The laser projection system according to claim 1, wherein,
    the laser light source emits a red light, a blue light and a green light; and
    the human body detection module determines whether the object is a human according to a relationship between a reflectivity of the blue light and a reflectivity of the red light, and a relationship between a reflectivity of the green light and a reflectivity of the red light.

5. The laser projection system according to claim 1, wherein a projection range of the laser projection system is smaller than a detection range of the human body detection module.

6. The laser projection system according to claim 1, wherein after the human body detection module determines that the object is a human and reduces the laser output intensity of the laser light, if no human object is detected by the human body detection module in a subsequent detection, the human body detection module increases the laser output intensity of the laser light.

7. The laser projection system according to claim 1, further comprising:
    a distance detection module detecting respective distances between regions of a projection surface and the laser projection system for dynamically adjusting the laser output intensity region by region.

8. The laser projection system according to claim 7, wherein the distance detection module obtains a distance information of the projection surface for establishing a distance map and further adjusting the output intensity of the laser light region by region according to the distance map.

9. The laser projection system according to claim 7, wherein a projection range of the laser projection system is smaller than a detection range of the distance detection module.

* * * * *